(12) United States Patent
Feng et al.

(10) Patent No.: US 8,287,678 B2
(45) Date of Patent: Oct. 16, 2012

(54) METHOD AND DEVICE FOR FABRICATING CARBON NANOTUBE FILM

(75) Inventors: Chen Feng, Beijing (CN); Kai-Li Jiang, Beijing (CN); Liang Liu, Beijing (CN); Shou-Shan Fan, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 361 days.

(21) Appl. No.: 12/592,884

(22) Filed: Dec. 3, 2009

(65) Prior Publication Data

US 2010/0263783 A1  Oct. 21, 2010

(30) Foreign Application Priority Data

Apr. 20, 2009  (CN) .......................... 2009 1 0106771

(51) Int. Cl.
*B32B 37/00* (2006.01)

(52) U.S. Cl. ............ 156/166; 156/160; 977/42; 977/52; 977/843

(58) Field of Classification Search .................. 156/166, 156/160; 977/843, 52, 42
See application file for complete search history.

(56) References Cited

U.S. PATENT DOCUMENTS

| | | | | |
|---|---|---|---|---|
| 3,040,352 A | * | 6/1962 | Vian | 15/104.002 |
| 3,682,690 A | * | 8/1972 | Amos et al. | 15/209.1 |
| 7,559,253 B2 | * | 7/2009 | Liu et al. | 73/827 |
| 7,973,295 B2 | * | 7/2011 | Jiang et al. | 250/492.1 |
| 2007/0193530 A1 | * | 8/2007 | Deroo | 119/618 |
| 2007/0237959 A1 | | 10/2007 | Lemaire | |
| 2008/0170982 A1 | | 7/2008 | Zhang et al. | |
| 2008/0246173 A1 | | 10/2008 | Braidwood et al. | |
| 2008/0248235 A1 | | 10/2008 | Feng et al. | |
| 2009/0092813 A1 | | 4/2009 | Lin et al. | |
| 2011/0117316 A1 | * | 5/2011 | Lemaire | 428/113 |

FOREIGN PATENT DOCUMENTS

CN  101409999  4/2009
* cited by examiner

*Primary Examiner* — Jeff Aftergut
(74) *Attorney, Agent, or Firm* — Altis Law Group, Inc.

(57) ABSTRACT

A method for fabricating a carbon nanotube film is disclosed. A carbon nanotube array is contacted by an adhesive device having an inclined surface to adhere the carbon nanotubes. The adhesive device is then moved away from the substrate.

18 Claims, 8 Drawing Sheets

METHOD AND DEVICE FOR FABRICATING CARBON NANOTUBE FILM

RELATED APPLICATIONS

This application claims all benefits accruing under 35 U.S.C. §119 from China Patent Application No. 200910106771.8, filed on Apr. 20, 2009 in the China Intellectual Property Office, the disclosure of which is incorporated herein by reference. This application is related to copending application entitled, "METHOD FOR MAKING CARBON NANOTUBE FILM", filed Dec. 3, 2009 application Ser. No. 12/592,879.

BACKGROUND

1. Technical Field

The present disclosure relates to methods and devices for fabricating carbon nanotube film, particularly, to a method and a device for drawing a carbon nanotube film from a carbon nanotube array.

2. Description of Related Art

Carbon nanotubes are tubules of carbon generally having a diameter of 0.5 to 100 nanometers, and composed of a number of coaxial cylinders of graphite sheets. Carbon nanotubes have interesting and potentially useful thermal, electrical and mechanical properties, and have recently attracted a great deal of attention for use in different applications such as field emitters, gas storage and separation, chemical sensors, and high strength composites.

However, the main obstacle to an actual application of carbon nanotube use is their difficulty to process, due to the powder form of the carbon nanotube products. Therefore, carbon nanotubes are formed into films to facilitate handling and processing thereof. At present, different methods are widely used for fabricating carbon nanotube films including: a growing method, a spraying method, and a Langmuir-Blodgett (LB) method. By using the growing method, a carbon nanotube film can be grown on a substrate. However, the method typically requires high temperature during the growing process and cannot be applied to substrates made of plastic. By using the spraying method, carbon nanotubes, dispersed in a solvent, are sprayed on a substrate. In this method, however, carbon nanotubes cannot be well-dispersed, due to their tendency to aggregate, and thus, a uniform film is difficult to form. By using the Langmuir-Blodgett (LB) method, carbon nanotubes are made soluble through an introduction of amide groups therein, and then through a step of "molecular self-assembly", the film accumulates on a substrate. However, the method forms a film of disordered carbon nanotubes, and so many excellent properties of the carbon nanotubes are sacrificed.

Recently, as disclosed by patent application US2008/0248235A1 to Feng et al., a new kind of carbon nanotube film has been fabricated. The carbon nanotube film is directly drawn from a carbon nanotube array by using a tool. This carbon nanotube film is a free standing film for the reason that the adjacent carbon nanotubes are joined end-to-end by van der Waals attractive force therebetween. The carbon nanotubes in the carbon nanotube film are aligned substantially along the same direction parallel to the surface of the film. Therefore, the carbon nanotubes in the carbon nanotube film are orderly arranged, and on the aligned direction of the carbon nanotubes, the carbon nanotube film can achieve good thermal and electrical conductivity. Further, for the reason that the carbon nanotubes are parallel to the surface of the carbon nanotube film, the carbon nanotube film has a high transparency, and is suitable for being used as a transparent conductive film. The carbon nanotube film is fabricated easily by selecting a plurality of carbon nanotubes having a predetermined width using a selecting tool such as a wide adhesive tape to contact the carbon nanotube array; and pulling the carbon nanotubes at an even speed to form the carbon nanotube film. The method is simple and can be easily adopted in practical mass production. Further, the carbon nanotube film is free standing and adhesive, and can be laid and attached most any place desired. Furthermore, the carbon nanotube film is flexible.

However, the quality of the carbon nanotube film, such as uniformity of the carbon nanotubes distributed therein, is largely affected by the selecting tool and defects may be formed in the film as well. The adhesive tape is difficult to be manipulated, and the contacting area between the carbon nanotubes and the adhesive tape is hard to be controlled. Further, the adhesive tape is soft. When the contacting area between the carbon nanotubes and the adhesive tape is relatively small, and the carbon nanotubes are not firmly adhered to the adhesive tape, during the drawing process some of the carbon nanotubes may detach from the adhesive tape, producing a carbon nanotube film with many defects.

What is needed, therefore, is to provide a device for drawing the carbon nanotube film that is capable of effectively increase the contact area between the carbon nanotubes and the device, and a method for drawing the carbon nanotube film by using the device.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
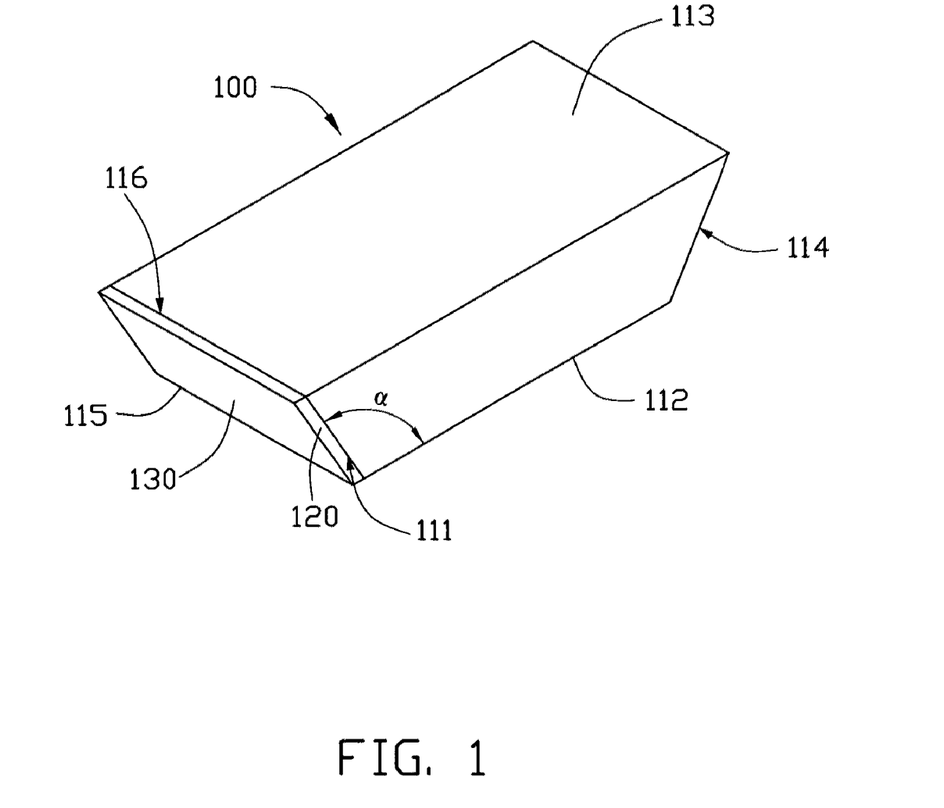
FIG. 1 is a schematic structural view of an embodiment of a device for drawing a carbon nanotube film.
Figure 2:
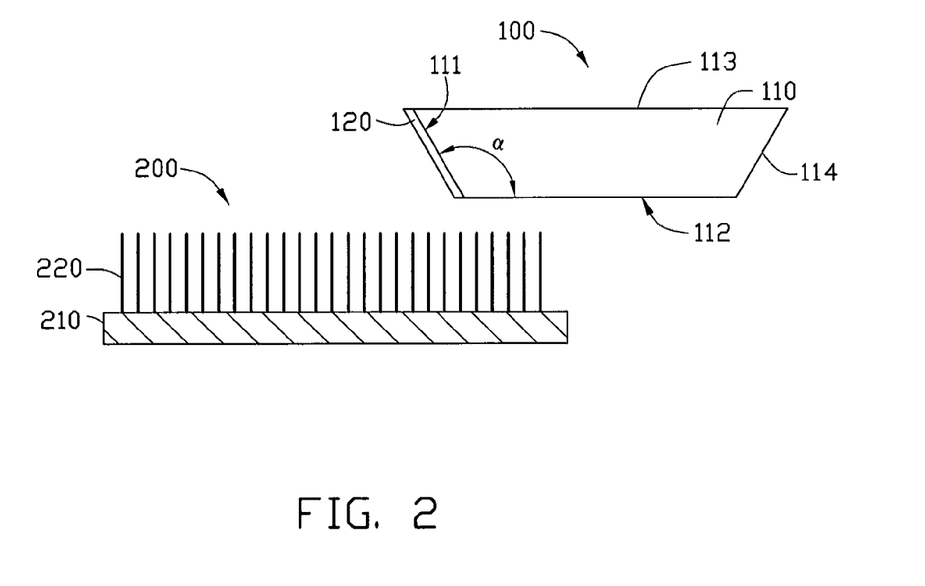
FIG. 2 is a schematic structural view of the device of FIG. 1.
Figure 3:
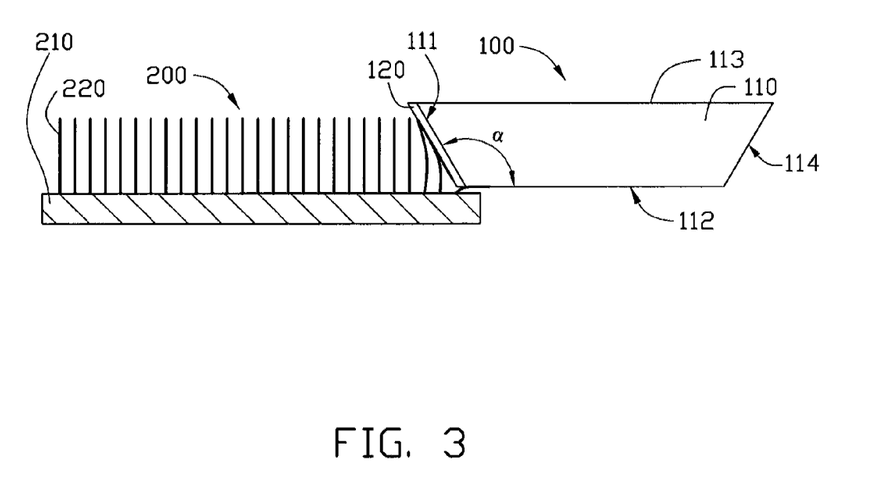
FIG. 3 is a schematic structural view of the device of FIG. 1 in contact with a carbon nanotube array.

Referring to FIGS. 1 to 3, according to an embodiment, a device 100 for drawing a carbon nanotube film from a carbon nanotube array 200 includes a body 110 and an adhesive layer 120 located on a region of the surface of the body 110. The carbon nanotube array 200 is formed on a substrate 210 and includes a plurality of carbon nanotubes 220 substantially perpendicular to the surface of the substrate 210. The carbon nanotubes 220 together form an array on the surface of the substrate 210.

The body 110 has a fixed shape and can be made of any suitable material including metal, steel, plastic, resin, crystal, or glass. In one embodiment, the body 110 of the device 100 is a polyhedron such as a hexahedron that includes a side surface 111, a bottom surface 112 connected to the side surface 111, a top surface 113 opposite to the bottom surface 112. The side surface 111 is connected to the bottom surface 112 at a contacting edge 115. The side surface 111 is connected to the top surface 113 at a top edge 116. In use, the contacting edge 115 is nearer to the carbon nanotube array 200 than the top edge 116. The contacting edge 115 is a straight line parallel to the surface of the substrate 210. An adhesive layer 120 can be located on the side surface 111, and include a contacting surface 130. The contacting surface is to contact with the carbon nanotube array 200. In other embodiment, the side surface 111 made of a suitable material without the adhesive layer 120 thereon can be directly used as the contacting surface 130 to contact with the carbon nanotube array 200.

The shape of the top surface 113 is not limited and can be curved or planar. The bottom surface 112 can be a planar surface and parallel to the surface of the substrate 210. The side surface 111 can be covered by the adhesive layer 120. The adhesive layer 120 is used for contacting a face of the carbon nanotube array 200 and adhere the carbon nanotubes 220 to the body 110. The shape of the side surface 111 is not limited, and can be curved or planar. The shortest distance from the top edge 116 to the contacting edge 115 is greater than the height of the carbon nanotube array 200 (i.e., the length of the carbon nanotubes 220).

In one embodiment, the side surface 111 is a planar surface, and an angle α between the side surface 111 and the bottom surface 112 is larger than 90° and smaller than 180° (e.g., in a range of 120°≦α≦150°). In other embodiments, the side surface 111 can be a cylindrical surface having an axis parallel to the contacting edge 115 and the surface of the substrate 210 when used to contact the carbon nanotubes. In the embodiment shown in FIGS. 1 to 3, the body 110 has six surfaces, two of which are parallel top surface 113 and bottom surface 112, that has a simple structure and is easy to be fabricated.

Figure 4:
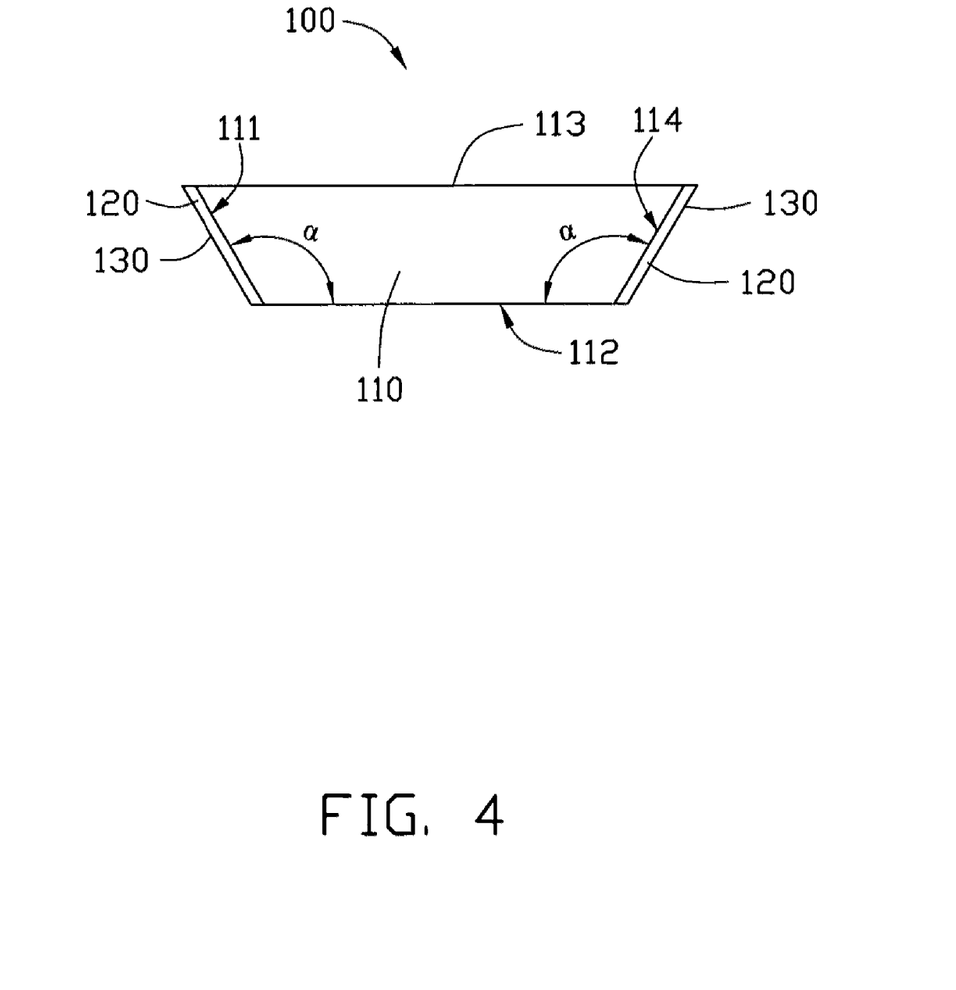
FIG. 4 is a schematic side view of an embodiment of a device for drawing a carbon nanotube film.

The adhesive layer 120 is located on the side surface 111 to adhere the carbon nanotubes 220 thereto. The adhesive layer 120 can be formed by a binder or glue. The adhesive layer 120 has a uniform thickness and at least covers the part of the side surface 111 that is adjacent to the contacting edge 115. In one embodiment, the adhesive layer 120 can be an adhesive tape with two adhesive surfaces, one of which is attached to the side surface 111. In one embodiment shown in FIG. 4, the device 100 can includes two contacting surface 113. The body 110 can have two opposite side surfaces 114 both be covered by adhesive layers 120, and thus, the device 100 can be used twice.

In use, the side surface 111 of the device 100 is moved toward the carbon nanotube array 200 until the contacting surface 130 of the adhesive layer 120 has sufficient contact with the carbon nanotubes 220 of the carbon nanotube array 200. The carbon nanotubes 220 contacted with the adhesive layer 120 are adhered on the device 100. After that, the device 100 is moved away from the carbon nanotube array 200 and a carbon nanotube film can be drawn out from the carbon nanotube array 200. The device 100 can be moved away from the carbon nanotube array 200 at a direction parallel to the surface of the substrate or a direction that has an elevation angle of less than 90 degrees to the surface of the substrate.

Referring to FIG. 3, the carbon nanotubes in contact with the bottom surface 112 may be pressed down on the substrate 210. However, due to the angle between the side surface 111 and the surface of the substrate 210 being smaller than 90° and larger than 0°, a plurality of carbon nanotubes 220 contacted to the adhesive layer 120 is pushed obliquely but not completely pressed down on the substrate 210. The contacting area of the carbon nanotube 220 is increased. For example, almost the entire length of the carbon nanotube 220 is attached on the adhesive layer 120. Further, the adhesive layer 120 is supported by the fixed shaped body 110, and a stronger force can be applied on the carbon nanotubes 220 by the adhesive layer 120, and thus firmly adhere the carbon nanotubes 220 thereto. Accordingly, during the drawing process, the carbon nanotubes 220 are not easily detached from the device 100. Further, when the contacting edge 115 is a straight line, a straight line of carbon nanotubes 220 in the carbon nanotube array 200 can be selected by the adhesive layer 120 adjacent the contacting edge 115. The selected carbon nanotubes 220 are drawn out from the carbon nanotube array 200 according to the movement of the device 100. The following carbon nanotubes 220 that were initially adjacent to the selected carbon nanotubes 220 are then drawn out by van der Waals attractive force between the following carbon nanotubes 220 and the initially selected carbon nanotubes 220. The carbon nanotube film will be formed by the carbon nanotubes 220 joined end-to-end by van der Waals attractive force therebetween. The straight contacting edge 115 enables the selected carbon nanotubes 220 being drawn out from the carbon nanotube array 200 at the same time. Therefore, the following carbon nanotubes 220 adjacent to the initially selected carbon nanotubes 220 are also drawn out at the same time. Thus, during the drawing process, the boundary between the carbon nanotube film and the carbon nanotube array 200 is maintained as a straight line. The carbon nanotube film is relatively more uniform and has fewer defects, and further has an even width which is equal to a length of the straight contacting edge 115.

Figure 5:
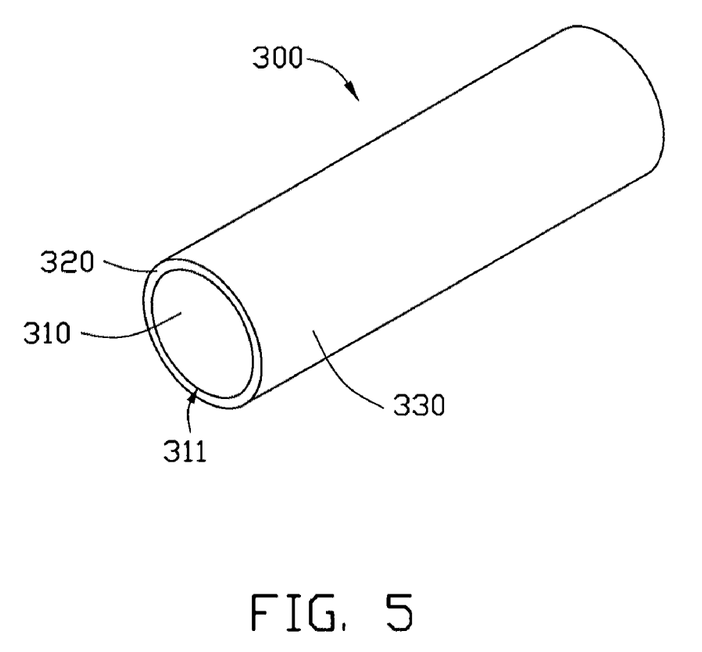
FIG. 5 is a schematic structural view of an embodiment of a device for drawing a carbon nanotube film.
Figure 6:
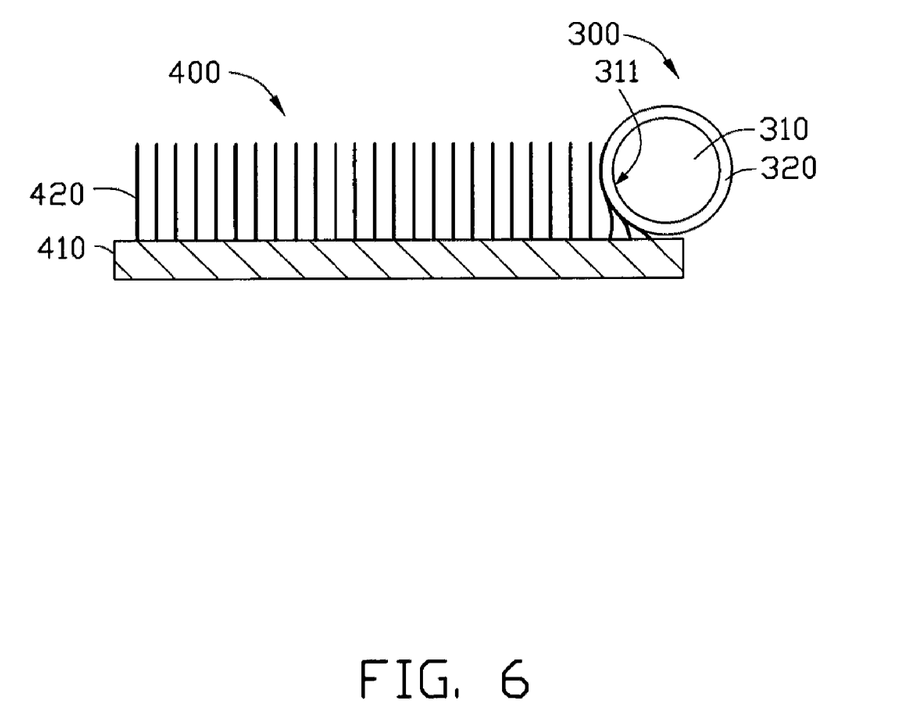
FIG. 6 is a schematic structural view of the device of FIG. 5 in contact with a carbon nanotube array.

Referring to FIGS. 5 and 6, according to an embodiment, a device 300 for drawing a carbon nanotube film from a carbon nanotube array 400 includes a body 310 and an adhesive layer 320 located on at least a region of surface of the body 310. The adhesive layer 320 includes a contacting surface 330 to contact with the carbon nanotube array 400. The carbon nanotube array 400 is formed on a substrate 410, and includes a plurality of carbon nanotubes 420 substantially perpendicular to the surface of the substrate 410. The carbon nanotubes 420 together form an array on the surface of the substrate 410.

Figure 7:
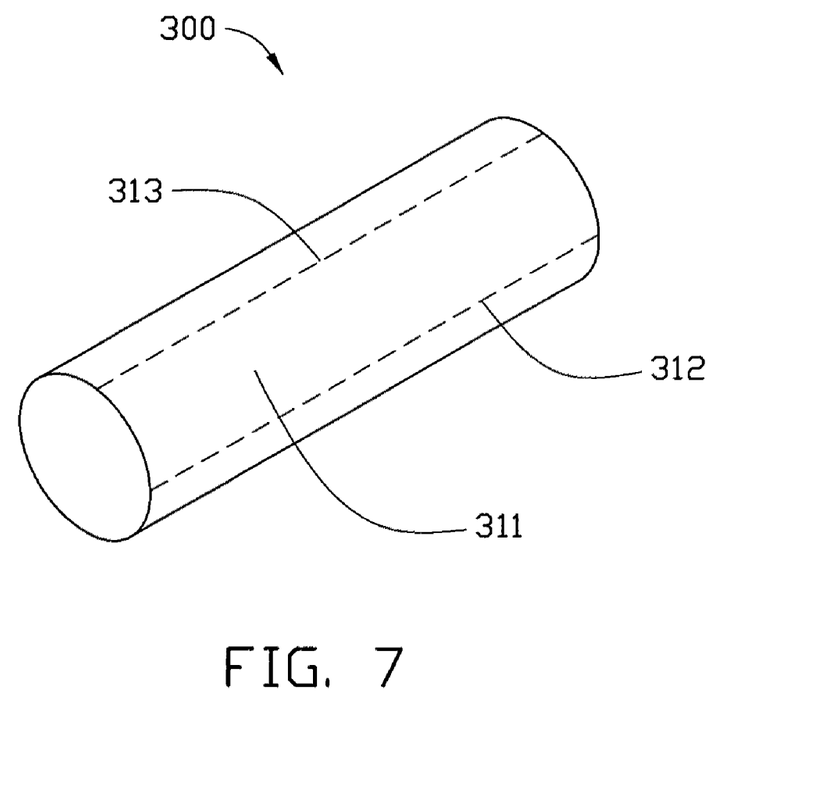
FIG. 7 is a schematic structural view of an embodiment of a device for drawing a carbon nanotube film.

The device 300 shown in FIGS. 5 to 7 is similar to the device 100 shown in FIGS. 1 to 3, and the body 310 of the device 300 is a cylinder including a side surface 311. At least a region of the side surface 311 is covered by the adhesive layer 320. The side surface 311 has a contacting edge 312 parallel to the axis of the cylinder body 310. In use, the contacting edge 312 is arranged to be the nearest edge of the contacting surface 311 that adjacent to the substrate 410 and parallel to the surface of the substrate 410. In one embodiment, as shown in FIG. 7, the region of the side surface 311 covered by the adhesive layer 320 can be a rectangle with a top edge 313 parallel to the contacting edge 312, and the distance between the two edges 311, 312 are larger than the height of the carbon nanotube array 400.

Other embodiments do not include an adhesive layer located on the side surface 311. That is, in use, the side surface 311 is directly contact to the carbon nanotubes. The side surface 311 can have a great attractive force to the carbon nanotubes that enables the adherence between the carbon nanotubes and the side surface 311. Certain materials, such as metal or plastic, are very adhesive to the carbon nanotubes. More specifically, the attractive force between the side surface 311 and the carbon nanotubes is greater than the force between the carbon nanotubes and the substrate, thus by moving the device, the carbon nanotubes can be drawn from the substrate. In one embodiment, the body can be made of metal or plastic that has a great attractive force to the carbon nanotubes. For example, a body similar to the bodies 110, 310, shown in FIG. 1 or FIG. 5 made of metal or plastic, without an adhesive, can be used as the device for drawing the carbon nanotubes.

A method for drawing a carbon nanotube film from a carbon nanotube array includes the following steps.

S11 providing a carbon nanotube array grown on a surface of a substrate with a plurality of carbon nanotubes substantially perpendicular to the surface of the substrate, and an adhesive device having a contacting surface to adhere the carbon nanotubes thereto.

S12, contacting the carbon nanotubes of the carbon nanotube array with the contacting surface of the adhesive device, and the contacting surface of the adhesive device is an inclined surface.

S13, moving the adhesive device away from the substrate thereby drawing the carbon nanotube film from the carbon nanotube array.

To be adhesive to the carbon nanotubes, the adhesive device can include a body with a side surface, and the side surface can be covered by an adhesive layer. Alternatively, the side surface of the body can be made of a material that has a great attractive force to the carbon nanotubes. Therefore, the side surface of the body can be used as the contacting surface to contact with the carbon nanotubes. The contacting surface has a straight contacting edge that is near to the carbon nanotube array during use.

In the embodiment shown in FIG. 1, when the contacting surface 130 is in contact with the carbon nanotubes of the carbon nanotube array, the bottom surface 112 can be kept to parallel to the surface of the substrate 210 when an angle between the bottom surface 112 and the side surface 111 is larger than 90 degrees and smaller than 180 degrees.

In the embodiment shown in FIG. 5, when the contacting surface 330 is in contact with the carbon nanotubes 420 of the carbon nanotube array 400, the axis of the cylinder body is parallel to the surface of the substrate 410.

In step S12, the adhesive device can be moved from a lateral side of the carbon nanotube array until the contacting surface is in contact with the carbon nanotubes while the contacting edge is parallel to the surface of the substrate. In other embodiments, the adhesive device is moved from above of the carbon nanotube array until the contacting surface is in contact with the carbon nanotubes while the contacting edge is parallel to the surface of the substrate.

When the contacting surface is in contact with the carbon nanotubes of the carbon nanotube array, the contacting edge is near to but not allowed to contact the substrate. In one embodiment, a gap is kept between the bottom surface and the surface of the substrate. Therefore, during the entire drawing process, the adhesive device is not allowed to contact the substrate to prevent any impurity on the substrate being adsorbed by the drawn carbon nanotube film.

When the carbon nanotubes in the carbon nanotube array contact the contacting surface they are pushed obliquely by the adhesive device but not completely pressed down to the substrate, and thus adhered on the adhesive layer or the contacting surface firmly.

In one embodiment, an angle between the moving direction of the adhesive device away from the substrate and the surface of the substrate is not larger than 50 degrees. The moving speed of the adhesive device away from the substrate is in the range from about 0.001 meter/second (m/s) to about 0.1 m/s. The drawing force is smaller than 1 N.

Figure 8:
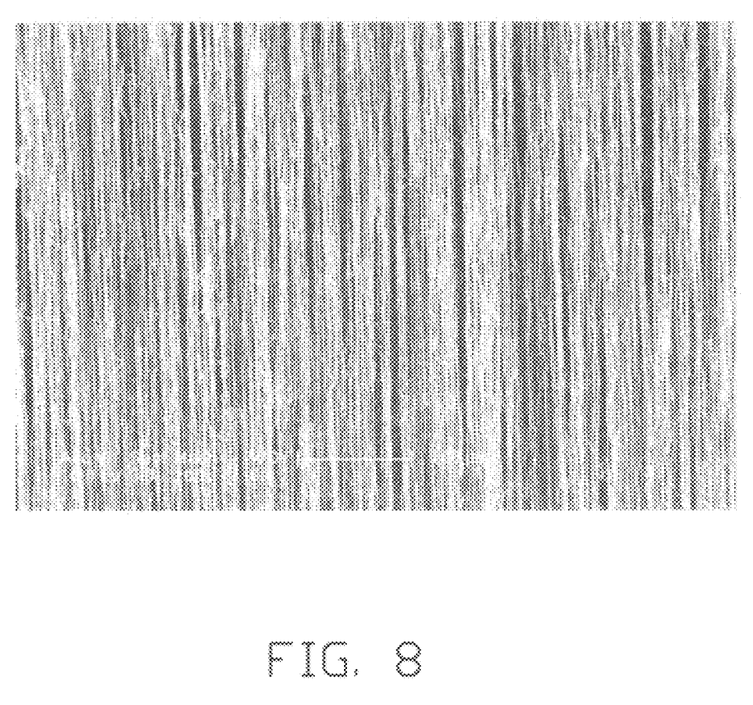
FIG. 8 shows a Scanning Electron Microscope (SEM) image of a carbon nanotube film drawn from a carbon nanotube array.

Referring to FIG. 8, the resulting carbon nanotube film includes a plurality of carbon nanotubes uniformly distributed therein, and the carbon nanotubes are combined by van der Waals attractive force therebetween. More specifically, the carbon nanotube film includes a plurality of successive and oriented carbon nanotubes joined end-to-end by van der Waals attractive force therebetween. The carbon nanotubes in the carbon nanotube film are substantially aligned in a single direction. The carbon nanotube film is a free-standing film. A thickness of the carbon nanotube film can range from about 0.5 nanometers to about 100 micrometers. The single carbon nanotube film has a specific surface area of above about 100 $m^2/g$.

Finally, it is to be understood that the above-described embodiments are intended to illustrate rather than limit the invention. Variations may be made to the embodiments without departing from the spirit of the invention as claimed. Elements associated with any of the above embodiments are envisioned to be associated with any other embodiments. The above-described embodiments illustrate the scope of the invention but do not restrict the scope of the invention.

It is also to be understood that the above description and the claims drawn to a method may include some indication in reference to certain steps. However, the indication used is only to be viewed for identification purposes and not as a suggestion as to an order for the steps.

What is claimed is:

1. A method for fabricating a carbon nanotube film, the method comprising steps of:
    providing a carbon nanotube array grown on a surface of a substrate having a plurality of carbon nanotubes substantially perpendicular to the surface of the substrate, and an adhesive device, wherein the adhesive device comprises of a body and an inclined contacting surface to adhere selected carbon nanotubes of the plurality of carbon nanotubes;
    contacting the selected carbon nanotubes with the inclined contacting surface to push the selected carbon nanotubes aligned obliquely to the surface of the substrate and adhere the selected carbon nanotubes to the inclined contacting surface; and
    moving the adhesive device away from the substrate,
    wherein the inclined contacting surface comprises a straight contacting edge; if the inclined contacting surface is in contact with the selected carbon nanotubes of the carbon nanotube array, the contacting edge is parallel and adjacent to the surface of the substrate.

2. The method of claim 1, wherein the body comprises a side surface, and the inclined contacting surface is defined by at least a region of the side surface.

3. The method of claim 2, wherein the body further comprises a bottom surface, and an angle between the side surface and the bottom surface is greater than 90 degrees and less than 180 degrees, if the inclined contacting surface is in contact with the selected carbon nanotubes of the carbon nanotube array, the bottom surface is kept parallel to the surface of the substrate.

4. The method of claim 2, when the inclined contacting surface is in contact with the selected carbon nanotubes, an axis of the body is kept parallel to the surface of the substrate.

5. The method of claim 1, wherein the adhesive device is moved from a lateral side of the carbon nanotube array, and when the inclined contacting surface is in contact with the selected carbon nanotubes, the contacting edge is parallel to the surface of the substrate.

6. The method of claim 1, wherein the adhesive device is moved from above of the carbon nanotube array, and when the inclined contacting surface is in contact with the selected carbon nanotubes, the contacting edge is parallel to the surface of the substrate.

7. The method of claim 1, wherein if the inclined contacting surface is in contact with the selected carbon nanotubes of the carbon nanotube array, a gap is kept between the adhesive device and the substrate.

8. The method of claim 1, wherein an angle between a moving direction of the adhesive device away from the substrate and the surface of the substrate is less than or equal to 50 degrees.

9. The method of claim 1, wherein a speed of moving the adhesive device away from the substrate is in a range from about 0.001 m/s to about 0.1 m/s.

10. An adhesive device for fabricating a carbon nanotube film comprising:
a body comprising a side surface, an edge, and a bottom surface, the bottom surface being planar and connected to the side surface at the edge, an angle between the side surface and the bottom surface is larger than 90 degrees and smaller than 180 degrees; and
an inclined contacting surface located on the side surface of the body to draw the carbon nanotube film from a carbon nanotube array by drawing selected carbon nanotubes from a growing substrate of the selected carbon nanotubes;
wherein the inclined contacting surface comprises a straight contacting edge, the edge of the body is a straight edge, the straight contacting edge of the inclined contacting surface is coincided with the edge of the body.

11. The adhesive device of claim 10, further comprising an adhesive layer, wherein the adhesive layer is located on the side surface, the adhesive layer is adhesive to carbon nanotubes, and a surface of the adhesive layer is defined as the inclined contacting surface.

12. The adhesive device of claim 11, wherein a material of the body is selected from the group consisting of metal, steel, plastic, resin, crystal, and glass.

13. The adhesive device of claim 10, wherein the side surface is adhesive to carbon nanotubes and defined as the inclined contacting surface.

14. The adhesive device of claim 13, wherein a material of the body is plastic or metal.

15. The adhesive device of claim 13, wherein the edge is a straight contacting edge.

16. A method for fabricating a carbon nanotube film, the method comprising steps of:
providing a carbon nanotube array grown on a surface of a substrate with a plurality of carbon nanotubes substantially perpendicular to the surface of the substrate, and an adhesive device, wherein the adhesive device comprises of a body and an inclined contacting surface to adhere selected carbon nanotubes of the plurality of carbon nanotubes;
contacting the selected carbon nanotubes with the inclined contacting surface to push the selected carbon nanotubes aligned obliquely to the surface of the substrate;
pressing down a part of carbon nanotubes on the surface of the substrate by the adhesive device, the part of carbon nanotubes being adjacent to the selected carbon nanotubes; and
moving the adhesive device away from the substrate to draw the selected carbon nanotubes away from the substrate with the adhesive device, thus forming the carbon nanotube film from the carbon nanotube array.

17. The adhesive device of claim 16, wherein the body further comprises a bottom surface directly connected with the inclined contacting surface at a bottom edge, and an angle between the side surface and the bottom surface is greater than 90 degrees and less than 180 degrees, if the contacting surface is in contact with the selected carbon nanotubes of the carbon nanotube array, the bottom surface is kept parallel to the surface of the substrate, and a gap is kept between the bottom surface and the surface of the substrate.

18. The adhesive device of claim 17, wherein the body further comprises a top edge, and a shortest distance from the top edge to the bottom edge is greater than a length of the selected carbon nanotubes.

* * * * *